United States Patent
Bose et al.

[11] 3,982,168
[45] Sept. 21, 1976

[54] PHASE SHIFTER FOR CONTROLLING THE POWER COMPONENTS AND POWER FACTOR OF A CYCLOCONVERTER

[75] Inventors: Bimal K. Bose, Troy; Paul M. Espelage, Ballston Lake, both of N.Y.

[73] Assignee: General Electric Company, Schenectady, N.Y.

[22] Filed: Mar. 26, 1975

[21] Appl. No.: 562,338

[52] U.S. Cl. .............................. 321/69 R; 307/261; 328/13
[51] Int. Cl.² ..................................... H02M 5/27
[58] Field of Search ...................... 321/7, 60, 69 R; 323/119, 123; 307/252 N, 252 P, 261; 328/13, 72, 74

[56] References Cited
UNITED STATES PATENTS

| | | |
|---|---|---|
| 3,678,367 | 7/1972 | McMurray .............................. 321/7 |
| 3,742,336 | 6/1973 | Bedford ................................. 321/7 |
| 3,849,719 | 11/1974 | Geiersbach et al. .............. 321/69 R |

*Primary Examiner*—William H. Beha, Jr.
*Attorney, Agent, or Firm*—Donald R. Campbell; Joseph T. Cohen; Jerome C. Squillaro

[57] ABSTRACT

A phase shifter circuit generates cycloconverter reference signals for independently and linearly controlling the real power and input power factor or real and reactive power in either polarity. Using the per phase line voltage as a reference phasor, its amplitude and phase are adjusted by a sine-cosine converter, analog multipliers and summing amplifiers. The phase shifter has an almost instantaneous response and can be controlled by polarity reversing dc control signals.

14 Claims, 10 Drawing Figures

PHASOR DIAGRAM FOR REAL POWER CONTROL

PHASOR DIAGRAM FOR POWER FACTOR CONTROL

PHASE SHIFTER FOR CONTROLLING THE POWER COMPONENTS AND POWER FACTOR OF A CYCLOCONVERTER

BACKGROUND OF THE INVENTION

This invention relates to a phase shifter circuit for controlling the power components and input power factor of a cycloconverter or other converter operating on infinite bus. More particularly, the invention relates to a fast response phase shifter circuit for generating cycloconverter reference signals for independently controlling the real power and input power factor or reactive power.

In a power system in which a number of phase-controlled cycloconverters operate with low frequency outputs in parallel, such as paralleled variable speed constant frequency (VSCF) converters wherein each individual capacity is small compared to the total system capacity, then a cycloconverter can be considered to be operating essentially on an infinite bus. The situation is analogous to a synchronous machine operating on an infinite bus, and real and reactive power in the cycloconverter have been controlled by adjusting the amplitude and phase of the induced voltage. Frequency and voltage control have been employed in a manner similar to that used in conventional synchronous machine systems. The frequency control circuit used a phase locked loop system incorporating R-C phase shifting networks and discriminators in the feedback loop. The voltage control circuit was identical to that of a conventional cycloconverter except that the feedback signal was derived from a discriminator which received polarized circulating currents. These circuits are complicated, have slow response characteristics, and additionally are sensitive to frequency drift and have serious mutual interactions.

The prior art control schemes are not suitable for cycloconverters with faster response characteristics, as for example the cascaded high frequency link cycloconverter system described in U.S. Pat. No. 3,742,336 to B. D. Bedford and allowed application Ser. No. 419,490 now U.S. Pat. No. 3,882,369, by W. McMurray, both assigned to the assignee of this invention. In the usual mode of operation supplying power to the load, the input cycloconverter operates in regenerative fashion, however reverse power flow is possible and the control should accommodate power flow in either direction. For such a converter system with or without the output cycloconverter in which the high frequency link parallel resonant circuit is operated at a variable frequency, usually in the kilohertz range, the control circuit should be distortion free, have an almost instantaneous response characteristic, and be insensitive to supply voltage drift. Additionally, the real and reactive power or input power factor should selectively be controllable independently and conveniently.

SUMMARY OF THE INVENTION

In accordance with the invention, a phase shifter is provided for generating cycloconverter reference signals having a controlled amplitude and phase shift with respect to the per phase line voltage used as a reference phasor. The phase and amplitude shifters achieve independent and linear control of the real power and input power factor in either polarity, or the real and reactive power in either polarity, by using polarity reversing dc control signals. These circuits are comprised by a frequency insensitive sine-cosine converter for converting the input sine wave signals representative of the per phase line voltage to cosine waves of proportional amplitude, multipliers for varying the amplitude and polarity of the input sine wave signal and only the amplitude of another signal selectively in dependence upon the magnitude and polarity of the dc control signals, and summers for producing an intermediate summation signal and the output cycloconverter reference signal. Integrated circuit components including analog multipliers and operational amplifiers may be used in constructing the circuit, which is distortion free and insensitive to line voltage frequency drift.

The preferred embodiments are employed in controlling the input power factor and both polarities of real power. In the general application approach, the theoretical basis of operation is that an $\bar{E}_x$ phasor in phase with the line voltage phasor is modulated to vary the power factor while maintaining real power constant; and that when an $\bar{E}_z$ phasor is constructed at a selected fixed angle $\phi$ with respect to the line voltage phasor and its amplitude is modulated, the real power component is modulated while maintaining the power factor constant. In a special application phase shifter for a three phase supply balanced as to amplitude and phase, the frequency insensitive cosine wave is generated by addition or subtraction of the other per phase line voltages, and only a single multiplier and summer are required. The power factor is set at unity or can be changed by effectively varying the magnitude of the input sine wave signal before summing with the variable amplitude cosine wave signal, whose amplitude and polarity are determined by the real power control signal.

DESCRIPTION OF THE PREFERRED EMBODIMENTS

Figure 1:
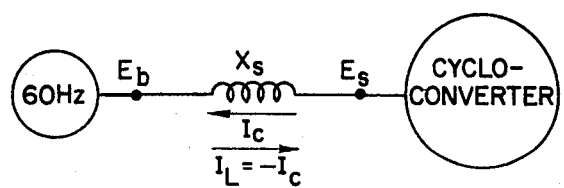
FIG. 1 shows diagrammatically a cycloconverter analogy to a synchronous machine.

In the diagram shown in FIG. 1 of a cycloconverter analogy to a synchronous machine operating on infinite bus or from a "stiff" source, 60 Hz power is supplied through a filter inductor or reactor $X_s$ to the cycloconverter. For simplicity the impedance $X_s$ is assumed to be purely reactive. The sine wave line voltage at the input terminals is identified as $E_b$ while the induced voltage directly at the cycloconverter input is identified as $E_s$. Following the synchronous machine analogy, $I_c$ is the current flowing in a direction from the cycloconverter to the source, and $I_L = -I_c$ is the current flowing from the source to the cycloconverter.

Figure 2:
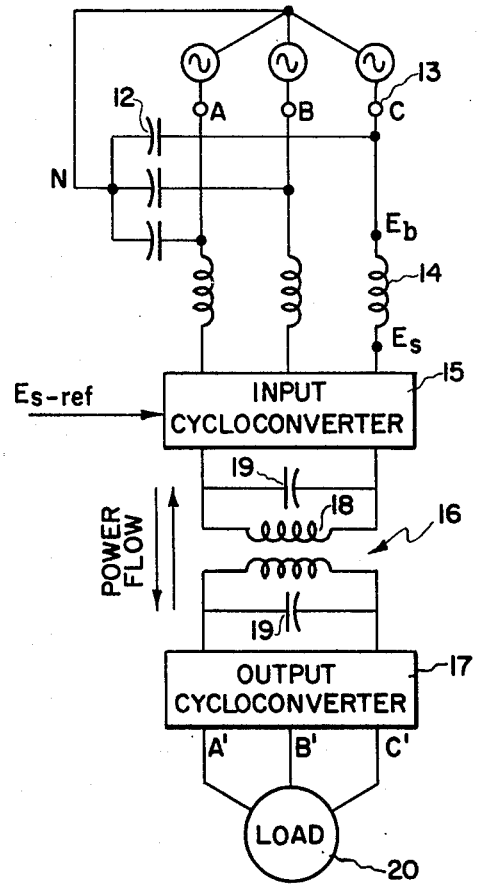
FIG. 2 is a schematic block diagram of a cascaded high frequency link cycloconverter system, the preferred application of the invention being the control of the input cycloconverter.

The preferred application of the invention is to generate cycloconverter reference voltages for controlling the real power and input power factor or reactive power of the input cycloconverter in the high frequency link cycloconverter system shown diagrammatically in FIG. 2. The wye-connected cycloconverter system is illustrated in detail in FIG. 15 of the previously mentioned U.S. Pat. No. 3,882,369, to which the reader is referred for further information. Briefly, the input filter includes three filter capacitors 12 respectively connected between the neutral terminal N and the input terminals 13 for the three lines A, B, and C, and further includes three filter inductors 14 respectively connected between the input terminals 13 and the input cycloconverter 15. A high frequency tank or parallel resonant L-C commutation circuit 16 is provided between the cascaded input cycloconverter 15 and output cycloconverter 17 and can include a reactor-coupling transformer 18 having a pair of capacitors 19 placed across the primary and secondary windings. The twelve-thyristor input and output cycloconverters, each comprising three single phase-to-single phase cycloconverters with an input filter and an output filter (not illustrated), are identical to one another but connected in mirror image fashion. When supplying power to load 20, the input regenerating cycloconverter 15 operates the tuned high frequency tank 16 directly from the polyphase ac supply at a frequency above its resonant frequency, and the amount of available commutating energy is controlled by the tank frequency, since the capacitor reactive power increases and the inductor reactive power decreases as the frequency is raised. In the case of power flow in a direction from the load to the source, the input cycloconverter 15 is controlled in conventional fashion and operates in rectifying mode to return power to the supply. In a typical application of this cycloconverter system as a variable speed ac motor drive, the source is a three phase, 60 Hz, 230 volt supply, the high frequency tank is operated at about 2-4 kHz, and the adjustable voltage, three phase output at the load has a variable frequency between 0-300 Hz. To relate FIG. 1 to FIG. 2, the infinite bus sine wave line voltage $E_b$ is the per phase voltage at the input terminals 13, the induced voltage $E_s$ is the phasor summation of the line voltage and the voltage produced across a filter inductor 14, and the phase shifter herein described employs the line voltage $E_b$ as a reference phasor and adjusts its amplitude and phase to generate the desired per phase cycloconverter reference voltage $E_{s\text{-}ref}$.

Figure 3:
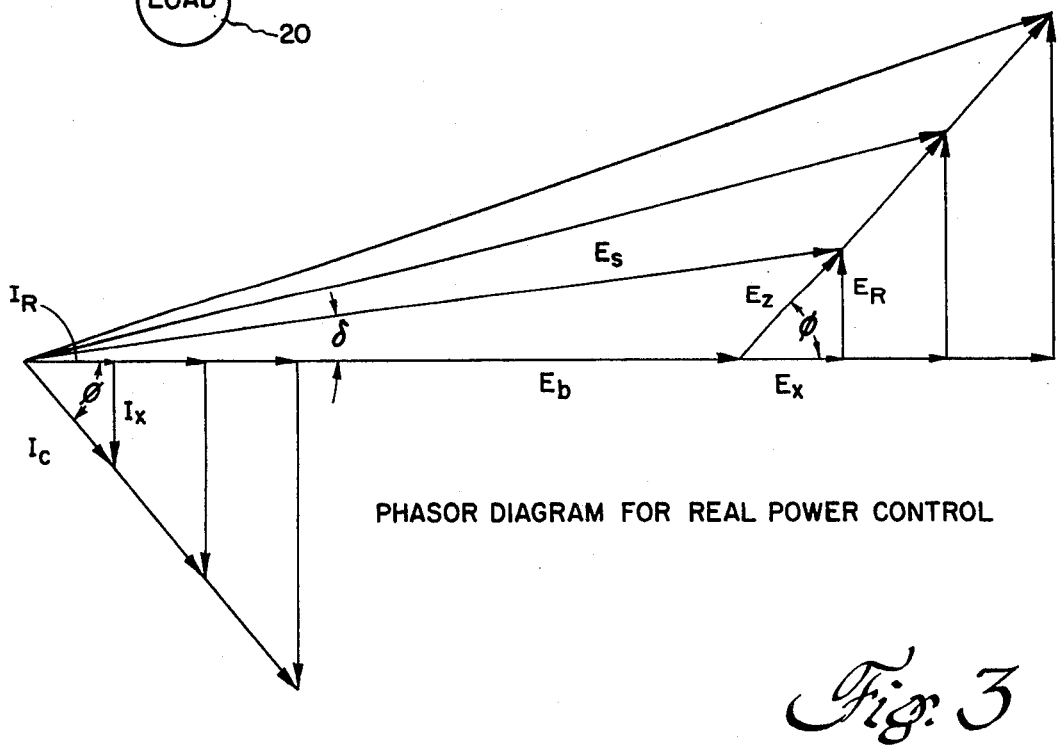
FIGS. 3–6 are phasor diagrams illustrating the theoretical basis for real power control and power factor control as herein taught.

Referring now to FIG. 1 and also to FIG. 3 which gives the phasor diagram for real power control according to the invention, the induced voltage phasor $\bar{E}_s$ can be constructed as $$\bar{E}_s = \bar{E}_b + \bar{E}_z = \bar{E}_b + \bar{E}_x + \bar{E}_R,$$

where $$\bar{E}_z = \bar{I}X_s, \bar{E}_x = \bar{I}_x X_s, \text{ and } \bar{E}_R = \bar{I}_R X_s.$$

Figure 4:
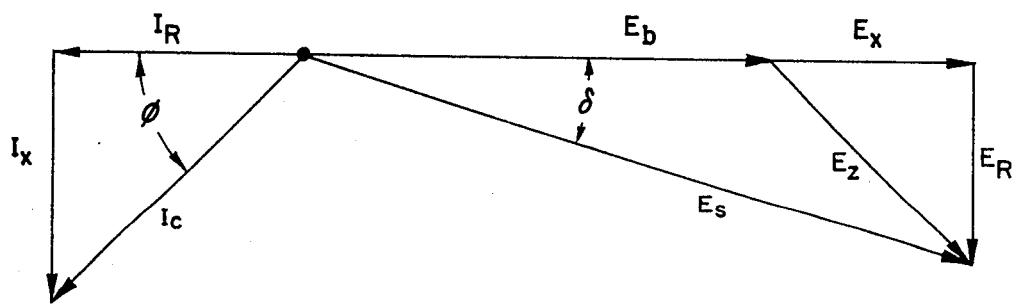
Figure 5:
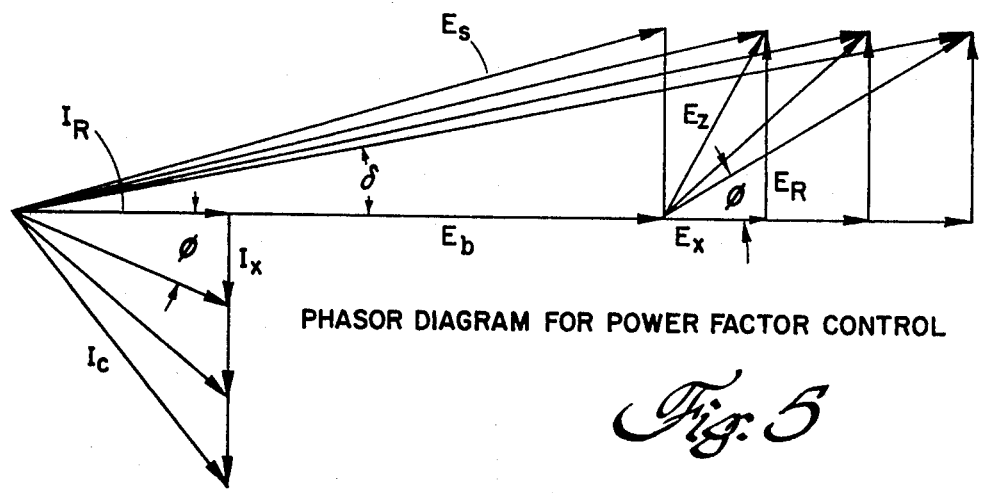
Figure 6:
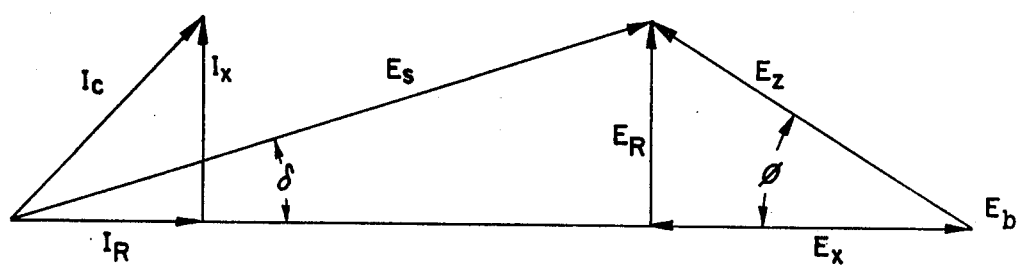

Therefore, when the $\bar{E}_z$ phasor is constructed at a fixed angle $\phi$ and its amplitude is modulated as illustrated in FIG. 3, the real power will be modulated maintaining the input power factor constant. It will be noted that FIG. 3 is drawn with respect to the cycloconverter current $I_c$, in which case the angle $\delta$ between $\bar{E}_b$ and $\bar{E}_s$ is greater than zero and power flow is from the cycloconverter to the source. As shown in FIG. 4, when $\bar{E}_z$ is constructed in the fourth quadrant by reversing $\bar{E}_R$, the cycloconverter will revert from the active or rectifier mode to the inverter or regenerative mode, and real power flows in the other direction from the source to the load. It is noted in FIG. 4 that the angle $\delta$ is less than zero and that the power flows in the reverse direction from that shown in FIG. 3 since $I_c$ is constructed in the third rather than in the fourth quadrant. FIG. 5 shows the phasor diagram for leading input power factor control. To modulate the input power factor, conventionally defined as $\cos\phi$, the phasor $\bar{E}_x$ is modulated to control the input power factor while maintaining the real power constant. As the phasor $\bar{E}_R$ remains constant for the several cases illustrated, the angle $\phi$ changes, and therefore the input power factor, as the in-phase phasor $\bar{E}_x$ is modulated. When the phasor $\bar{E}_x$ is reversed in direction as shown in FIG. 6, the input power factor changes from the leading to the lagging region. In this regard, it will be observed that the cycloconverter current $I_c$ changes from the fourth quadrant to the first quadrant. FIGS. 5 and 6 are both for the case of cycloconverter to source power flow. A phasor diagram for a reactive power control is not illustrated but is obviously similar to FIG. 3. In all of these phasor diagrams the angle $\delta$ between the reference line voltage $E_b$ and the desired induced voltage $E_s$ is assumed to be small.

Figure 7:
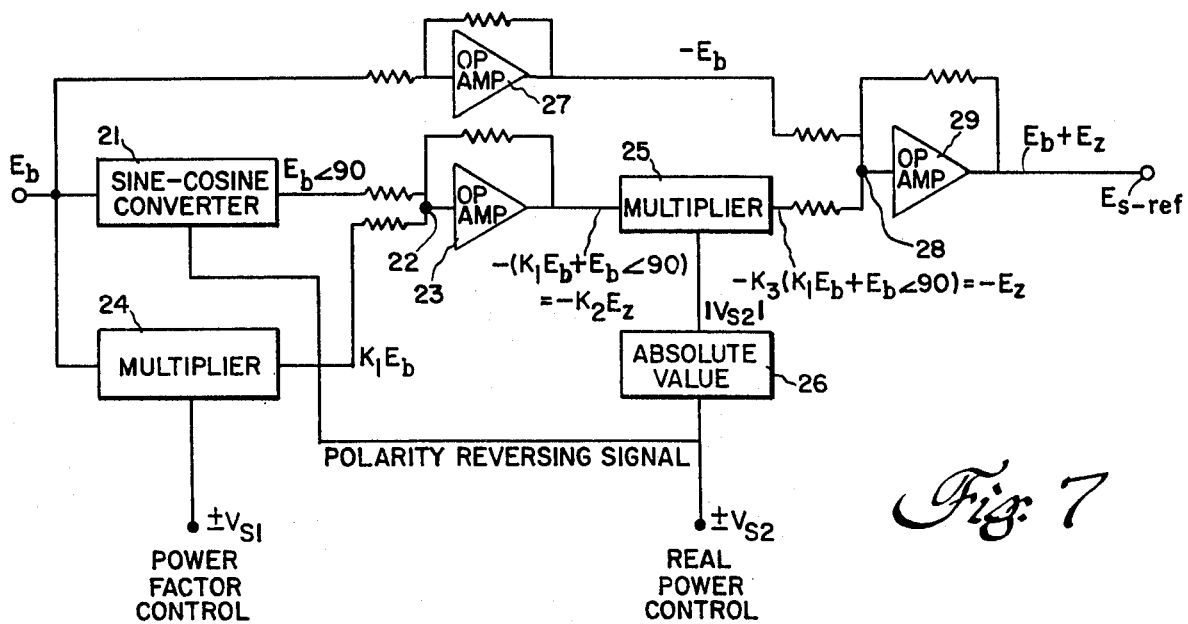
FIG. 7 is a block diagram of a phase shifter circuit for generating cycloconverter reference signals for independently and linearly controlling real power and input power factor in either polarity.

FIG. 7 shows a simple single phase amplitude and phase shifting circuit according to the first embodiment of the invention for generating cycloconverter reference signals which can control the real power and input power factor of the cycloconverter independently and linearly by dc signal voltages. The phase shifter circuit is insensitive to bus or line voltage frequency drift, is distortion free, and has an almost instantaneous response characteristic. In addition, the real power and power factor angle can be changed to either polarity by simply reversing the polarity of the dc control signals. To construct a three phase amplitude and phase shifting circuit, of course, three of the single phase circuits shown in FIG. 7 are required. Ordinarily the signal levels are reduced by the gain factor of the cycloconverter, and thus the per phase input sine wave line voltage signal $E_b$ is preferably obtained in the case of the FIG. 2 system by means of a stepdown potential transformer directly coupled between one input terminal 13 and the neutral terminal N. The input line voltage signal (see FIG. 7) is converted to a cosine wave or the signal $E_b$ <90 of proportional amplitude using a sine-cosine converter 21. Preferably converter 21 is the device described in the copending allowed application Ser. No. 561,592 by the inventors entitled "Frequency Insensitive Sine Wave-To-Cosine Wave Converter," filed on Mar. 24, 1975, and assigned to the same assignee as this invention. This converter employs the trigonometric relationship $\cos \omega t = \sqrt{1-\sin^2\omega t}$ and is operative over a wide frequency range with an almost instantaneous response characteristic to produce constant amplitude cosine waves. In one form implemented with presently available integrated circuits, the converter includes an analog multiplier for generating a sine wave squared signal, a clamping circuit for effectively shifting the voltage level of the sine wave squared signal, a sign inverter for generating a cosine wave squared signal, a square rooter for producing a negative-going full wave rectified cosine wave, a second sign inverter, and a polarizer for converting the positive-going full wave rectified cosine wave to the desired ac cosine wave. Another suitable prior art technique for frequency insensitive cosine wave generation involves integrating the sine wave and then multiplying the amplitude of the cosine wave by a voltage proportional to the frequency. The resulting cosine wave is fed through an input resistor to the summing junction 22 of an operational amplifier 23 connected at a summing amplifier. In a parallel branch, the sine wave line voltage signal is supplied as one input to an analog four-quadrant multiplier 24, the second input to the multiplier being the dc power factor control signal $v_{s1}$. Depending upon the desired input power factor, whether leading or lagging, the dc control signal $v_{s1}$ can be of either polarity. The resulting sine wave signal ($k_1E_b$) is fed through another input resistor to the summing junction 22. When $v_{s1}$ is positive, the output sine wave $k_1E_b$ has the same polarity as the input sine wave $E_b$ and a peak amplitude depending upon the magnitude of $v_{s1}$, and when $v_{s1}$ is negative, the output sine wave has the opposite polarity and a peak amplitude depending upon the magnitude of $-v_{s1}$. At the output of operational amplifier 23 the summation signal that is generated is $-(k_1E_b + E_b <90) = -k_2E_z$. In terms of the phasor diagram for the power factor control given in FIG. 5, the in-phase sine wave signal (indicative of $\bar{E}_x$) is multiplied or modulated according to the desired power factor, while the cosine wave signal (indicative of $\bar{E}_R$) remains constant, the two being summed to obtain the summation signal (indicative of $\bar{E}_z$).

To implement the real power control, the summation signal at the output of operational amplifier 23 is fed to one input of another analog multiplier 25, the second input to this multiplier being the absolute value of a real power control signal $v_{s2}$. Since $v_{s2}$ can be of either polarity depending upon the commanded direction of power flow through the cycloconverter, an absolute value circuit 26 is used to invert the negative polarity dc signal. The output summation signal of multiplier 25 can be expressed mathematically $-k_3(k_1E_b + E_b <90) = -E_z$. In terms of the phasor diagram for real power control given in FIG. 3, the effect of using multiplier 24 is to vary the amplitude of the summation signal produced at the output of operational amplifier 23 according to the magnitude of $v_{s2}$. The real power control signal $v_{s2}$ is also used as a polarity reversing signal for the sine-cosine converter 21. Thus, when $v_{s2}$ is negative a negative cosine wave is generated by converter 21. The input signal $E_b$ is also inverted by means of another operational amplifier 27 connected as a sign inverter, and the signal representing $-E_b$ is fed through an input resistor to the summing junction 28 of still another operational amplifier 29 connected as a summing amplifier. Since the other input to summing junction 28 is the variable amplitude summation signal representative of $-E_z$, the output of operational amplifier 29 is the desired cycloconverter reference signal $E_{s-ref}$. In this phase shifter circuit, it is obvious that the input power factor and real power can each be adjusted independently of one another, and that either may be held constant while varying the other.

Figure 8:
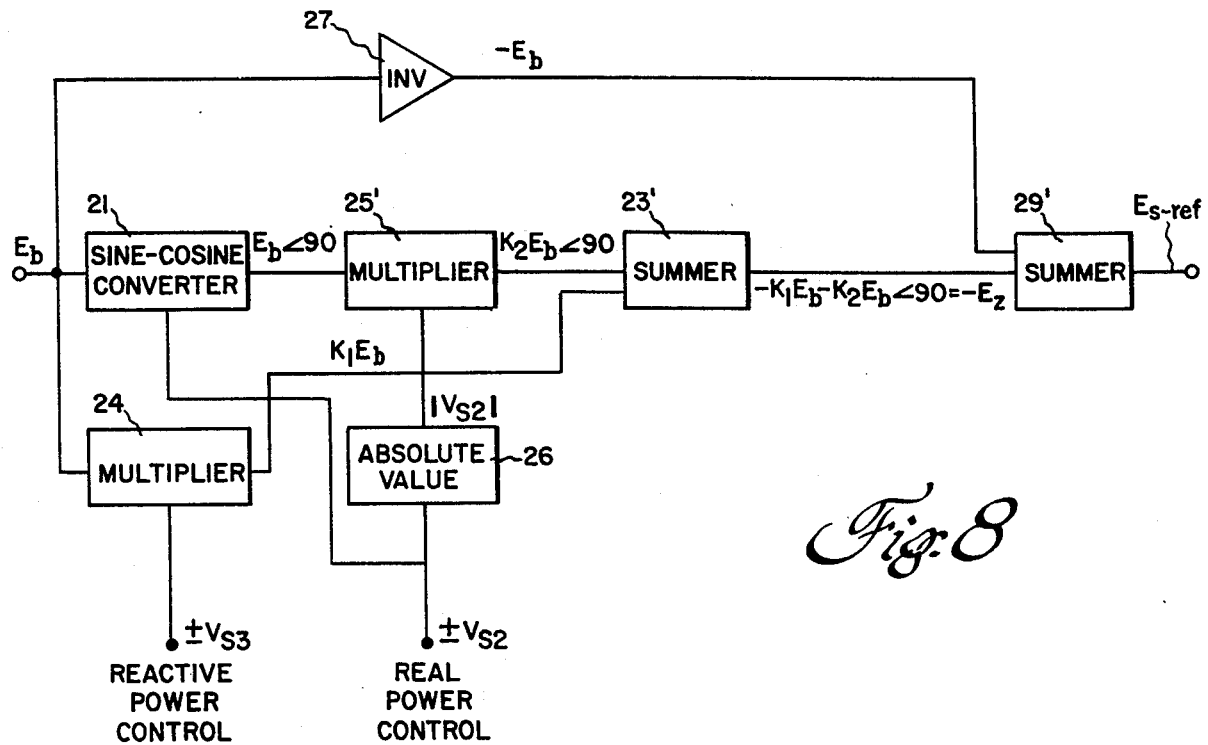
FIG. 8 is a block diagram of a phase shifter circuit according to a second embodiment of the invention similar to that in FIG. 7 but with independently controllable real and reactive power.

FIG. 8 shows another embodiment of the invention which is similar to FIG. 7 but has the capability of producing a single phase cycloconverter reference signal for independently controlling the reactive power and the real power of the cycloconverter. In this phase shifting circuit, the analog multiplier 25' is placed at the output of sine-cosine converter 21. Accordingly, the frequency insensitive cosine wave generated by converter 21 is modulated in dependence upon the magnitude of the absolute value of the real power control signal $v_{s2}$. In the parallel branch, the second input to multiplier 24 for operating on the input sine wave line voltage signal $E_b$ is a reactive power control signal $v_{s3}$ which can be of either polarity. The variable amplitude cosine wave signal from multiplier 25' and the variable amplitude sine wave signal are then summed by the summer 23' to generate a variable amplitude summation signal representative of the impedance phasor $-\bar{E}_z$. In terms of the phasor diagram of FIG. 3, the operation of effectively modulating the signals representative of the $\bar{E}_x$ and $\bar{E}_R$ phasors by the respective control signals $v_{s3}$ and $v_{s2}$ to control the reactive power and real power is readily seen. The variable amplitude summation signal representing the $-\bar{E}_z$ phasor, in the same manner as in FIG. 7, is now summed with the inverted sine wave line voltage signal $-E_b$ using the summer 29' to obtain the desired reference signal $E_{s-ref}$.

Figure 9:
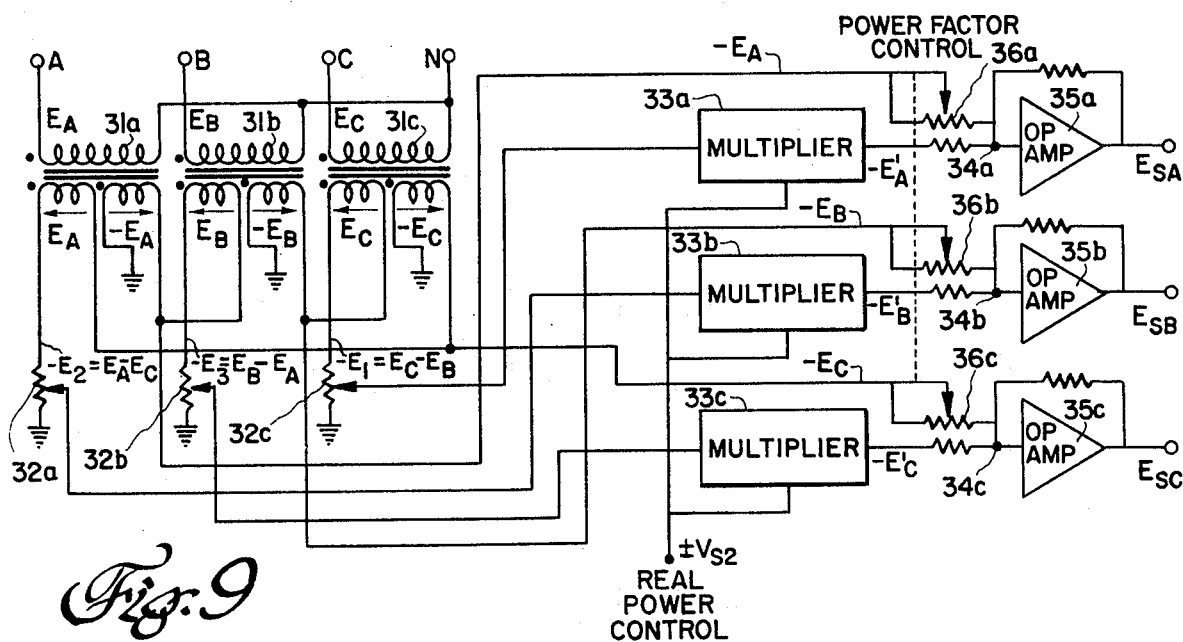
FIG. 9 is a block diagram of the preferred embodiment of the cycloconverter phase shifter circuit for controlling real power and optionally and independently controlling the input power factor.
Figure 10:
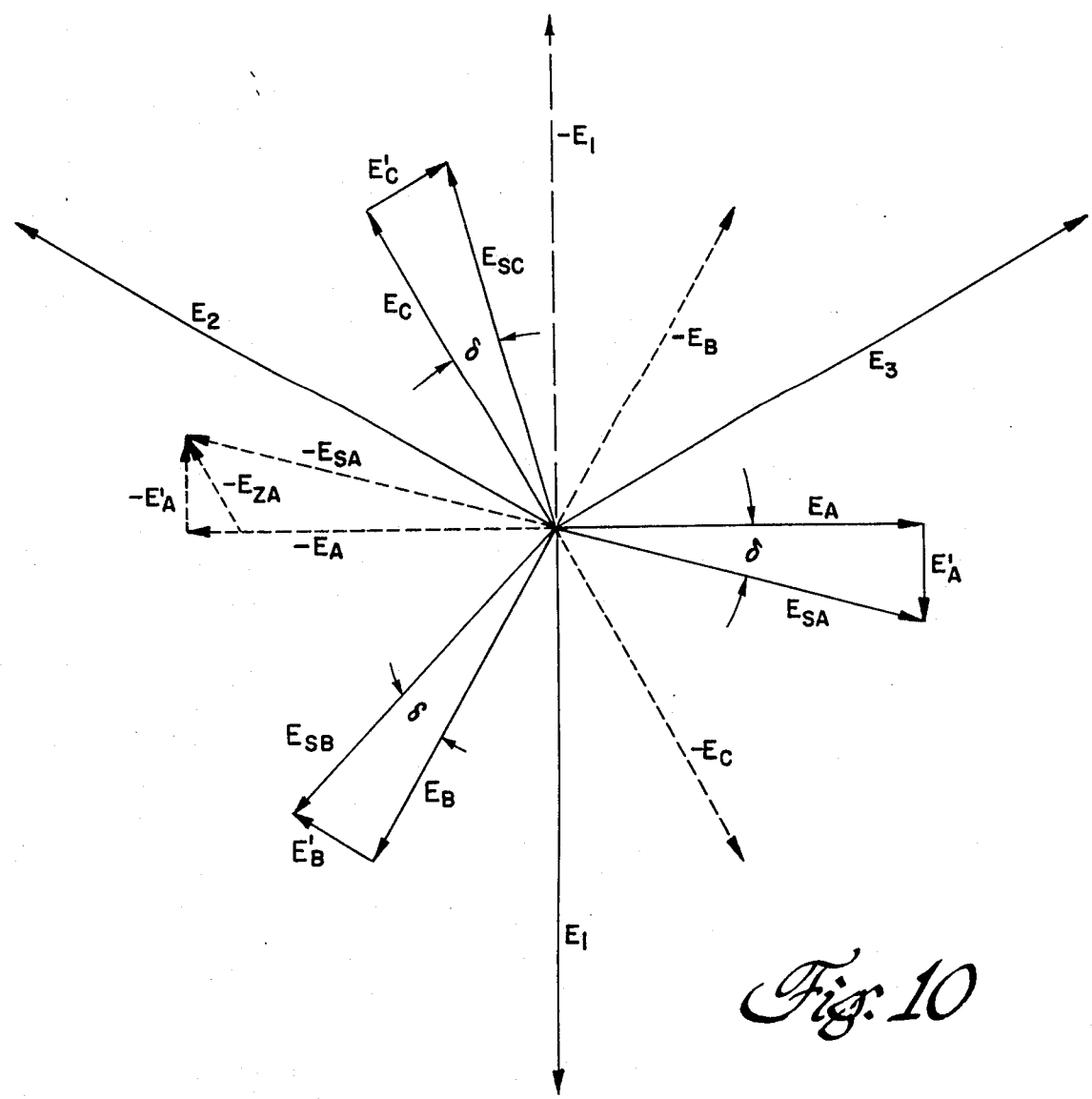
FIG. 10 is a phasor diagram used to explain the theory and operation of the FIG. 9 circuit.

As a special case when the three phase power supply is balanced in amplitude and phase, the cosine wave or frequency insensitive $E_b <90$ phasor can be generated conveniently by the addition and subtraction of the phase voltages. FIG. 9 shows the complete phase shifter circuit for a balanced system with provision for real power control and optional input power factor control in either the leading or the lagging direction. Alternatively, the input power factor may be always fixed at unity. FIG. 10 gives the phasor diagram used to explain the basis of operation of the FIG. 9 phase shifter circuit. To obtain the frequency insensitive cosine wave for each phase, as well as each signal phase line voltage, three step down transformers 31a, 31b, and 31c have their primary windings respectively connected between each input line and neutral. Each single phase transformer has a split secondary winding such that one gives the positive polarity phase voltage while the other gives the negative polarity phase voltage, e.g., $E_C$ and $-E_C$. The circuit for producing the phase A cycloconverter reference signal $E_{sA}$ will be explained by way of illustration, the other two phases being similar so that corresponding components in the three phases are indicated by corresponding numerals. To obtain the frequency insensitive 90° phase shifted cosine wave (in FIG. 10, see the phasor $-\bar{E}_1$ which is perpendicular to the reference line voltage phasor $\bar{E}_A$), the appropriate secondary windings of transformers 31b and 31c are connected to obtain a voltage signal representing $E_C-E_B$ which by phasor addition gives $-E_1$. To this end, as is illustrated, the dot end of the appropriate secondary winding of transformer 31b is grounded while the other end is connected to the undotted end of the appropriate secondary winding in transform 31c. The dot or positive polarity end of this latter secondary winding is coupled directly to a potentiometer 32c for deriving at the wiper a proportional voltage to be supplied as one input to the analog four-quadrant multiplier 33a. Real power control is obtained in a manner similar to that shown in FIG. 8. Thus, the positive or negative polarity real power control signal $v_{s2}$ is the second input to the multiplier 33a so as to generate at the output of the multiplier a cosine wave with a modulated amplitude representing the signal $-E_A'$. This cosine wave with a polarity and peak amplitude depending upon the polarity and magnitude of the real power control signal is fed through an input resistor to the summing junction 34a of an operational amplifier 35a connected as a summing amplifier. The other input to summing junction 34a is the negative-going sine wave line voltage $-E_A$ or a fraction thereof as determined by the setting of a potentiometer 36a used for power factor control. The potentiometer 36a is also used as an input resistor to the summing junction and is ganged with the other phase potentiometers 36b and 36c. This technique for controlling the input power factor is shown schematically in FIG. 10 since in effect modulating the magnitude of the $-\bar{E}_A$ phasor results in modulating the in-phase component of $-\bar{E}_{zA}$ while maintaining constant the quadrature component $-\bar{E}_A'$ to effect input power factor control as taught in FIG. 5. Due to the inverting characteristic of summing amplifier 35a, the output cycloconverter reference signal generated by summing amplifier 35a is the desired positive polarity signal $E_{sA}$. The respectively 120° displaced cycloconverter reference signals $E_{sB}$ and $E_{sC}$ are obtained at the outputs of the other channels. A unity input power factor is set by moving the wipers of the ganged potentiometers 36a-36c to the appropriate extreme positions, and can be replaced by simple input resistors to achieve a unity power factor without the adjustability feature. For electronic power factor control, potentiometers 36a-36c can be replaced by two-quadrant multipliers used as variable gain amplifiers. Then for gain = 1, PF = 1; for gain >1, PF = leading; and for 0 <gain <1, PF = lagging. Suitable multiplier and operational amplifier components for this special case phase shifter are the AD420 integrated circuit manufactured by Analog Devices, Inc., of Norwood, Mass., and the μA741C integrated circuit manufactured by Fairchild Camera and Instrument Corp. of Mountain View, Calif.

While the invention has been particularly shown and described with reference to several preferred embodiments thereof, it will be understood by those skilled in the art that various changes in form and details may be made therein without departing from the spirit and scope of the invention.

The invention claimed is:

1. A phase shifter circuit for generating cycloconverter reference signals for independently and linearly controlling the real power component and input power factor of the cycloconverter comprising converter means for converting input sine wave signals representative of the per phase line voltage to a cosine wave signal of proportional amplitude having a polarity dependent upon the polarity of a real power control signal, first multiplier means for varying the amplitude and polarity of said input sine wave signals in dependence upon the magnitude and polarity of an input power factor control signal to thereby generate a variable amplitude sine wave signal, first summing means for summing said cosine wave and variable amplitude sine wave signals to generate a summation signal, second multiplier means for varying the amplitude of said summation signal in dependence upon the magnitude of said real power control signal to thereby generate a variable amplitude summation signal, and second summing means for summing said input sine wave signals and variable amplitude summation signal to generate a cycloconverter reference signal for controlling the real power and input power factor of the cycloconverter.

2. A phase shifter circuit according to claim 1 wherein said real power and input power factor control signals are unidirectional voltage control signals.

3. A phase shifter circuit according to claim 2 wherein said first multiplier means is an analog four-quadrant multiplier and said summing means are each comprised by an operational amplifier connected as a summing amplifier.

4. A phase shifter circuit according to claim 3 further including an inverter circuit for inverting said input sine wave signals before being supplied to said second summing means.

5. A polyphase phase shifter circuit for generating cycloconverter reference signals for independently and linearly controlling the real power component and input power factor of the cycloconverter and comprising in each phase converter means for converting at least two input sine wave signals representative of the per phase line voltage to a cosine wave signal of proportional amplitude, multiplier means for varying the amplitude and polarity of said cosine wave signal in dependence upon the magnitude and polarity of a real power control signal to thereby generate a variable amplitude cosine wave signal, and summing means for summing said variable amplitude cosine wave signal and another per phase input sine wave signal to generate a cycloconverter reference signal for controlling the real power and input power factor of the cycloconverter.

6. A phase shifter circuit according to claim 5 wherein said real power control signal is a unidirectional voltage control signal.

7. A phase shifter circuit according to claim 6 further including means for adjustably reducing the amplitude of the cosine wave signal that is supplied to said multiplier means.

8. A phase shifter according to claim 6 wherein said multiplier means is an analog four-quadrant multiplier and said summing means is comprised by an operational amplifier connected as a summing amplifier.

9. A phase shifter circuit according to claim 6 further including input power factor control means for effectively varying the amplitude of the input sine wave signal that is summed with said variable amplitude cosine wave signal.

10. A phase shifter circuit according to claim 9 wherein said multiplier means is an analog four-quadrant multiplier and said summing means is comprised by an operational amplifier connected as a summing amplifier, and said input power factor control means is comprised by an adjustable resistance connected as an input resistor to said operational amplifier and to which is applied the input sine wave signal that is summed with said variable amplitude cosine wave signal.

11. A phase shifter circuit for generating cycloconverter reference signals for independently and linearly controlling the real power and reactive power components of the cycloconverter comprising converter means for converting input sine wave signals representative of the per phase line voltage to a cosine wave signal of proportional amplitude having a polarity dependent upon the polarity of a real power control signal, first multiplier means for varying the amplitude and polarity of said input sine wave signals in dependence upon the magnitude and polarity of a reactive power control signal to thereby generate a variable amplitude sine wave signal, second multiplier means for varying the magnitude of said cosine wave signal in dependence upon the magnitude of said real power control signal to thereby generate a variable amplitude cosine wave signal, first summing means for summing said variable amplitude sine wave and cosine wave signals to generate a summation signal, and second summing means for summing said input sine wave signals and summation signal to generate a cycloconverter reference signal for controlling the real and reactive power components of the cycloconverter.

12. A phase shifter circuit according to claim 11 wherein said real power and reactive power control signals are unidirectional voltage control signals.

13. A phase shifter circuit according to claim 12 wherein said first multiplier means is an analog four-quadrant multiplier and said summing means are each comprised by an operational amplifier connected as a summing amplifier.

14. A phase shifter circuit according to claim 13 further including an inverter circuit for inverting said input sine wave signals before being supplied to said second summing means.

* * * * *